(12) United States Patent
Broome

(10) Patent No.: US 6,292,312 B1
(45) Date of Patent: *Sep. 18, 2001

(54) ATHERMALIZED MOUNTS FOR LENSES

(75) Inventor: Barry G. Broome, Carlsbad, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,204

(22) Filed: Apr. 27, 2000

Related U.S. Application Data

(63) Continuation of application No. 09/002,931, filed on Jan. 5, 1998, now Pat. No. 6,040,950.

(51) Int. Cl.[7] .................................................. G02B 7/02
(52) U.S. Cl. ......................... 359/820; 359/819; 126/571; 126/700
(58) Field of Search ................................... 359/819, 820; 126/570, 571, 700, 698

(56) References Cited

U.S. PATENT DOCUMENTS

| | | | |
|---|---|---|---|
| 4,541,415 | 9/1985 | Mori | 359/820 |
| 4,717,227 * | 1/1988 | Mori | 126/700 |
| 4,861,137 | 8/1989 | Nagata | 359/820 |
| 5,283,695 | 2/1994 | Ziph-Schatzberg et al. | 359/820 |
| 5,570,238 | 10/1996 | Leary | 359/820 |
| 6,040,950 * | 3/2000 | Broome | 359/820 |

* cited by examiner

Primary Examiner—Loha Ben
(74) Attorney, Agent, or Firm—Blakely, Sokoloff, Taylor & Zafman LLP

(57) ABSTRACT

Several embodiment of an athermalizing apparatus is described. In one embodiment, the athermalizing apparatus includes a lens element and a support member coupled to the lens element. The support member has a sloped outer surface and a first coefficient of thermal expansion ("CTE"). The athermalizing apparatus further includes a rib member having a substantially complementary sloped surface that bears on the sloped outer surface of the support member. The rib member has a second CTE. The sloped outer surface of the support member forms a ramp angle with respect to an optical axis of the lens element. A radial expansion of the support and/or rib member causes an axial displacement of the support member as a function of the ramp angle.

30 Claims, 4 Drawing Sheets

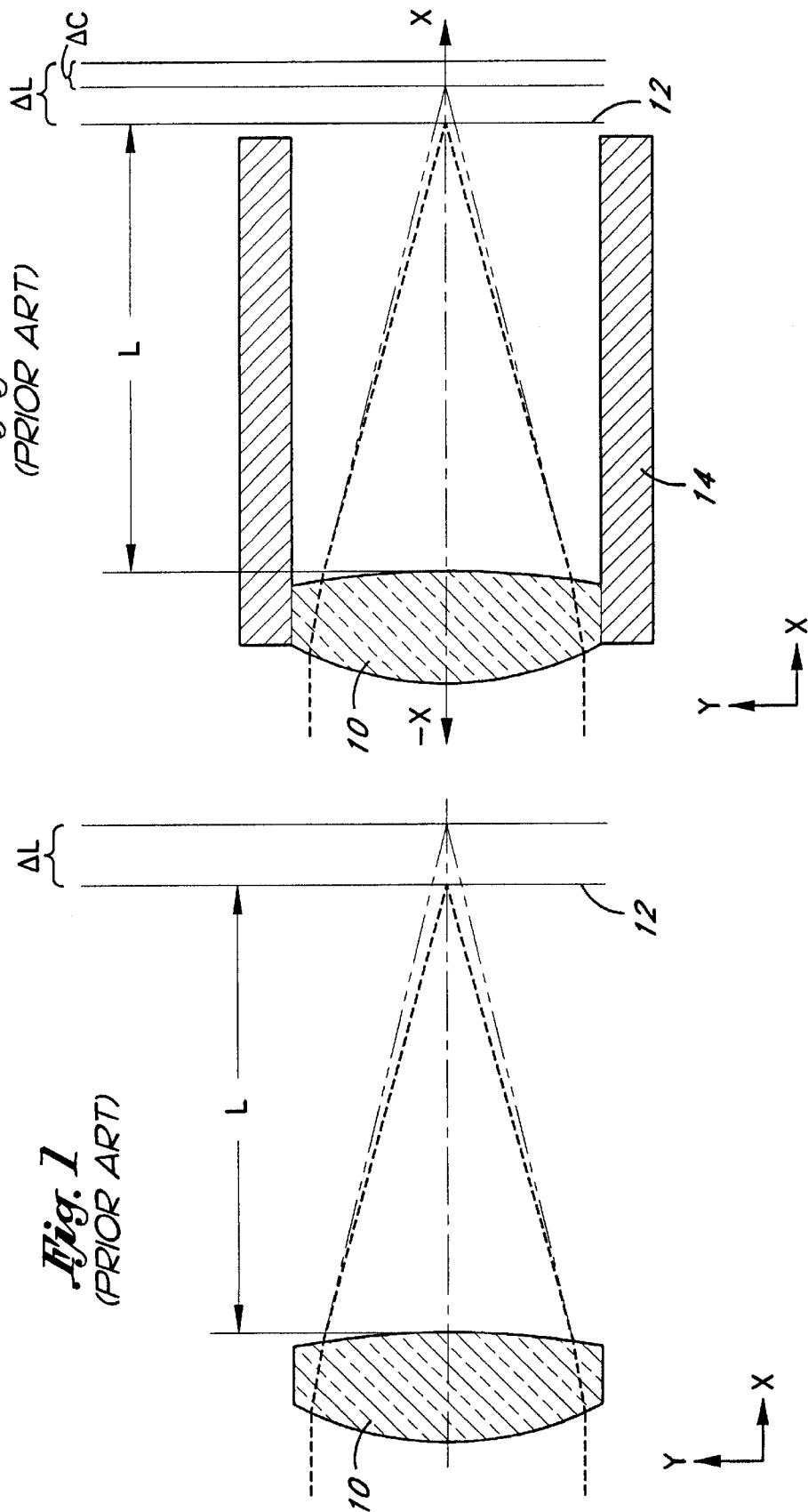

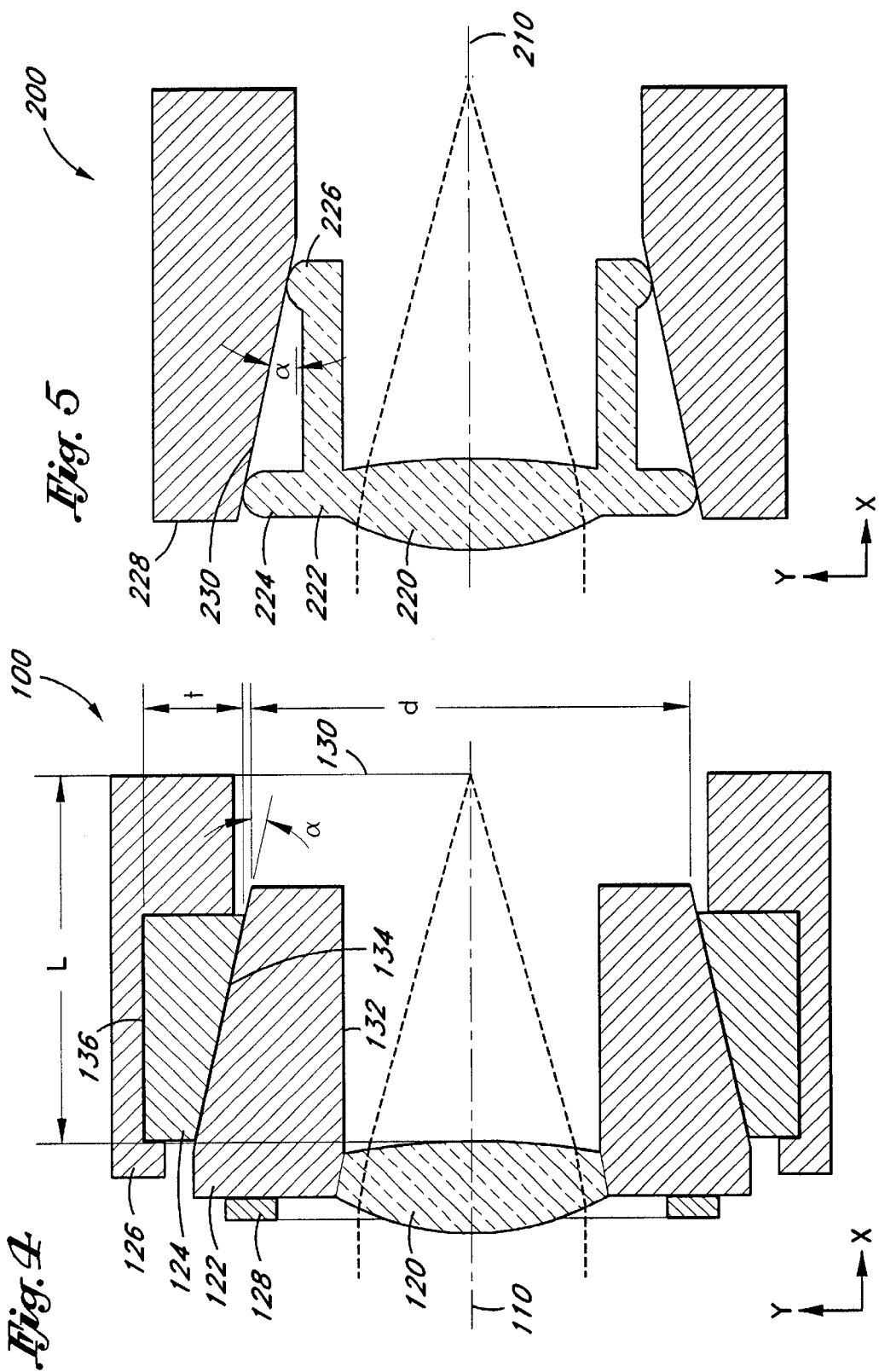

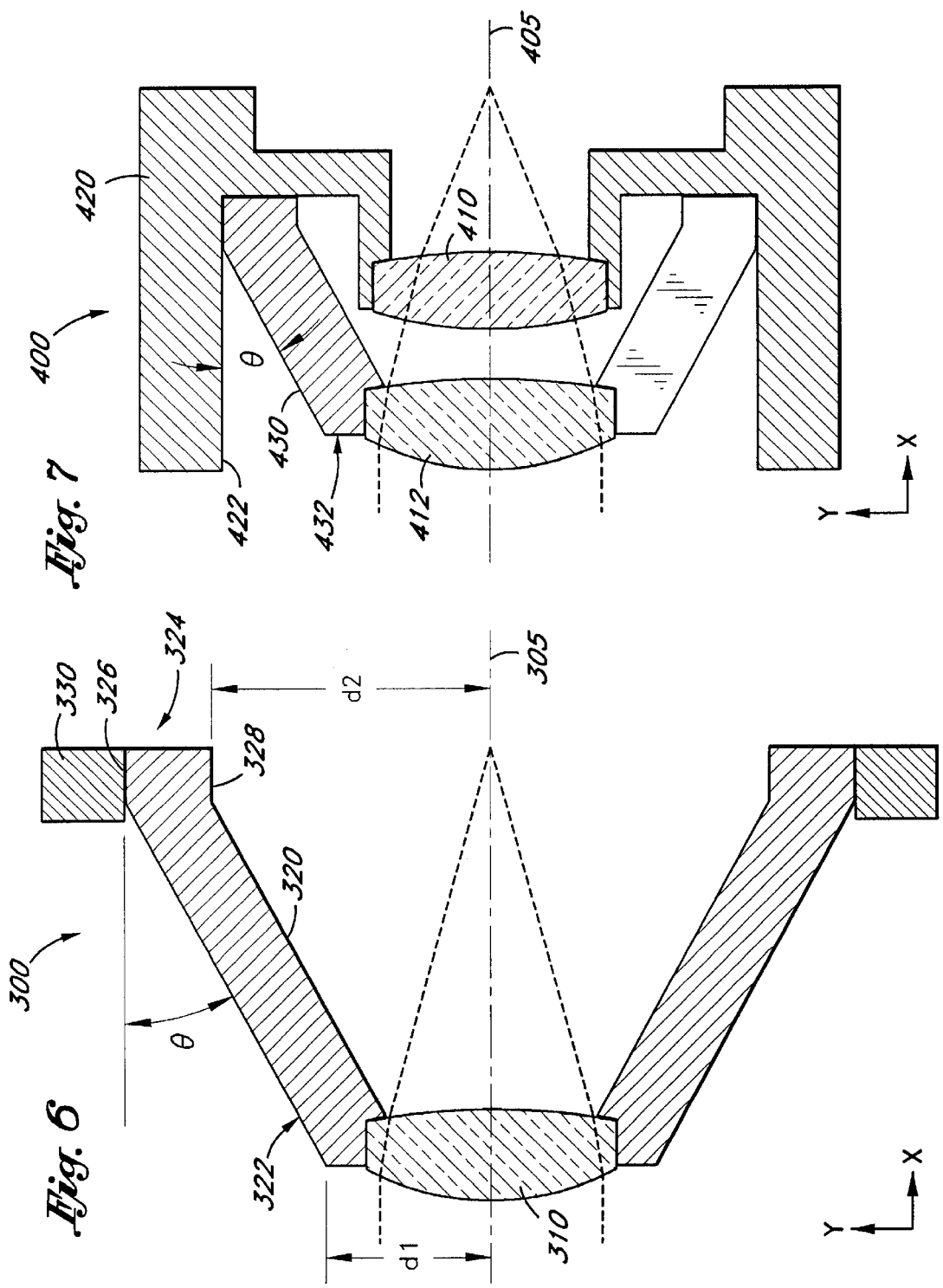

ATHERMALIZED MOUNTS FOR LENSES

CROSS-REFERENCES TO RELATED APPLICATIONS

This is a continuation of a U.S. patent application (application Ser. No. 09/002,931, filed Jan. 5, 1998 now U.S. Pat. No. 6,040,950.

BACKGROUND OF THE INVENTION

1. Field of the Invention

The present invention relates generally to the field of optical lens systems, and specifically, to athermalized mounts for lenses to compensate for thermal image defects due to temperature changes.

2. Background Information

Typically, lenses are used in many applications such as in cameras and camcorders. However, lenses have a potentially serious limitation in those applications involving moderate changes in temperature. In particular, changes in temperature produce a shift of a lens image plane and can also modify the aberration balance of the lens from the nominal lens design at room temperature (referred to as "thermal image defects"). The ability to effectively compensate for thermal image defects (referred to as "athermalization") opens the use of lenses to a large class of applications that do not permit active refocusing with variations in temperature.

The principal cause of these thermal image defects is the change in the refractive index of the lens material. The change in refractive index is called the dN/dT of the material and is typically –0.000120 per degree Centigrade for plastic lenses. For example, as the temperature increases, the refractive index for a plastic lens decreases which increases the focal length (since light is bent less) and the image plane of the plastic lens. Optical glasses, on the other hand, have dN/dT values in the +0.000003 per degree Centigrade range.

A secondary contributory factor for thermal image defects in lenses is due to the Coefficient of Thermal Expansion ("CTE"). As temperature increases, the radius of curvature of a lens becomes longer and its thickness increases. This causes the focal length to increase and thereby shift the image plane location further away from the lens. The CTE is much larger for plastic than glass. Consequently, thermal image defects is more severe in plastic lenses.

For optical systems that operate in the moderate to extreme temperature range, several solutions exist to athermalize for the degradation of image quality due to the change in the image plane location with temperature. Active athermalization involves using a motor to drive the lens or image plane as a function of temperature. As is apparent, this solution is undesirable because it requires power and adds to the cost of the lens system. Passive athermalization involves using a design that automatically corrects for the shift in the image plane with temperature.

One possible passive athermalization mechanism involves the combination of plastic materials and refractive power distributions in the lenses in a way that minimizes the thermal shift of focus and the change in aberration balance. This mechanism typically uses a hybrid glass/plastic lens design where most of the positive refractive power is vested in a glass element and the weakly-powered plastic elements are used for aberration balance. However, even for these hybrid glass/plastic lens designs, the thermal focal shift can be a serious concern and active focusing of the optical system is often the only real practical solution. Moreover, the use of a hybrid lens design requires a glass lens which increases cost.

FIG. 1 illustrates a simple singlet plastic lens element 10. Referring to FIG. 1, the singlet plastic lens element 10 is made from acrylic ("PMMA"), has a f/2.0 relative aperture, and an effective focal length ("EFL"), L, to an image plane 12, of 25.4 millimeters ("mm"). When the temperature is increased from +20° C. to +30° C., the distance of the image plane 12 from the rear vertex increases by ΔL or +0.071 mm.

FIG. 2 illustrates a prior art athermalizing plastic lens element apparatus. Referring to FIG. 2, the plastic lens element 10 is the same as shown in FIG. 1 and is supported by a mechanical support element 14 which is made from a high expansive material (e.g., acrylic). As the temperature increases and the image plane shifts away from the lens element, the mechanical support element 14 expands axially in the –X direction (i.e., opposite to the shift of the image plane) to partially compensate for the movement of the image plane 12. However, the compensation is almost always far from matching the image plane movement. For example, for a temperature increase from +20° C. to +30° C., the image plane increases by ΔL or +0.071 mm and the mechanical support element expands axially in the –X direction by ΔC or +0.019. The net result is an under compensation of 0.052 mm.

FIG. 3 illustrates another form of the prior art athermalized plastic lens element apparatus. In this embodiment, three nested cylindrical support elements are used to support the plastic lens element. Referring to FIG. 3, an inner cylinder 14 is made from a high expansive material (e.g., acrylic), a middle cylinder 16 is made from a low expansive material (e.g., Invar), and an outer cylinder 18 is made from a high expansive plastic. As temperature increases, the inner cylinder 14 expands axially in the –X direction as in FIG. 2. The middle cylinder 16 has an almost zero CTE and does not expand with temperature. Similar to the inner cylinder 14, the outer cylinder 18 expands axially in the –X direction to move the middle cylinder 16 in the –X direction which in turn further moves the inner cylinder 14 in the –X direction. In this embodiment, the inner and outer cylinders 14 and 18 both expand in an additive manner to effectively double the length of the axial expansion in the –X direction and provide greater compensation.

However, this embodiment usually cannot match the full image plane movement. For example, for a temperature increases from +20° C. to +30° C., this embodiment provides an axial compensation of ΔC or +0.037 mm. The net result is still an under compensation of +0.034 mm. Moreover, as the inner cylinder 14 expands with temperature, it tends to lock up hard against the surface of the middle cylinder 16. As the temperature decreases, the outer cylinder 18 contracts and tends to lock up against the surface of the middle cylinder 16.

These comparisons were performed with only a +10° C. change in temperature. The results are even more dramatic with higher temperature changes. Thus, prior art solutions do not provide a sufficient compensation for thermal image defects. The problem is complicated by the fact that multiple lens systems typically tend to be very compact and there is not enough room between the lenses to provide a long enough mechanical support member to compensate for the thermal image defects.

Accordingly, there is a need in the art for a method and apparatus to effectively compensate for thermal image defects in lenses due to changes in temperature while maintaining a compact design.

SUMMARY OF THE INVENTION

The present invention is an athermalizing apparatus. In one embodiment, the athermalizing apparatus includes a lens element and a support member coupled to the lens element. The support member has a sloped outer surface and a first coefficient of thermal expansion ("CTE"). The athermalizing apparatus further includes a rib member having a sloped surface substantially complementary and adjacent to the sloped outer surface of the support member. The rib member has a second CTE.

BRIEF DESCRIPTION OF THE DRAWINGS

The features and advantages of the present invention will become apparent from the following detailed description of the present invention in which:

FIG. 1 illustrates an exemplary simple singlet plastic lens element.

FIG. 2 illustrates a prior art athermalizing plastic lens element apparatus.

FIG. 4 illustrates a first athermalizing apparatus of the present invention.

FIG. 5 illustrates a second athermalizing apparatus of the present invention.

FIG. 6 illustrates a third athermalizing apparatus of the present invention.

FIG. 7 illustrates a fourth athermalizing apparatus of the present invention.

DESCRIPTION OF THE PREFERRED EMBODIMENT

Figure 3:
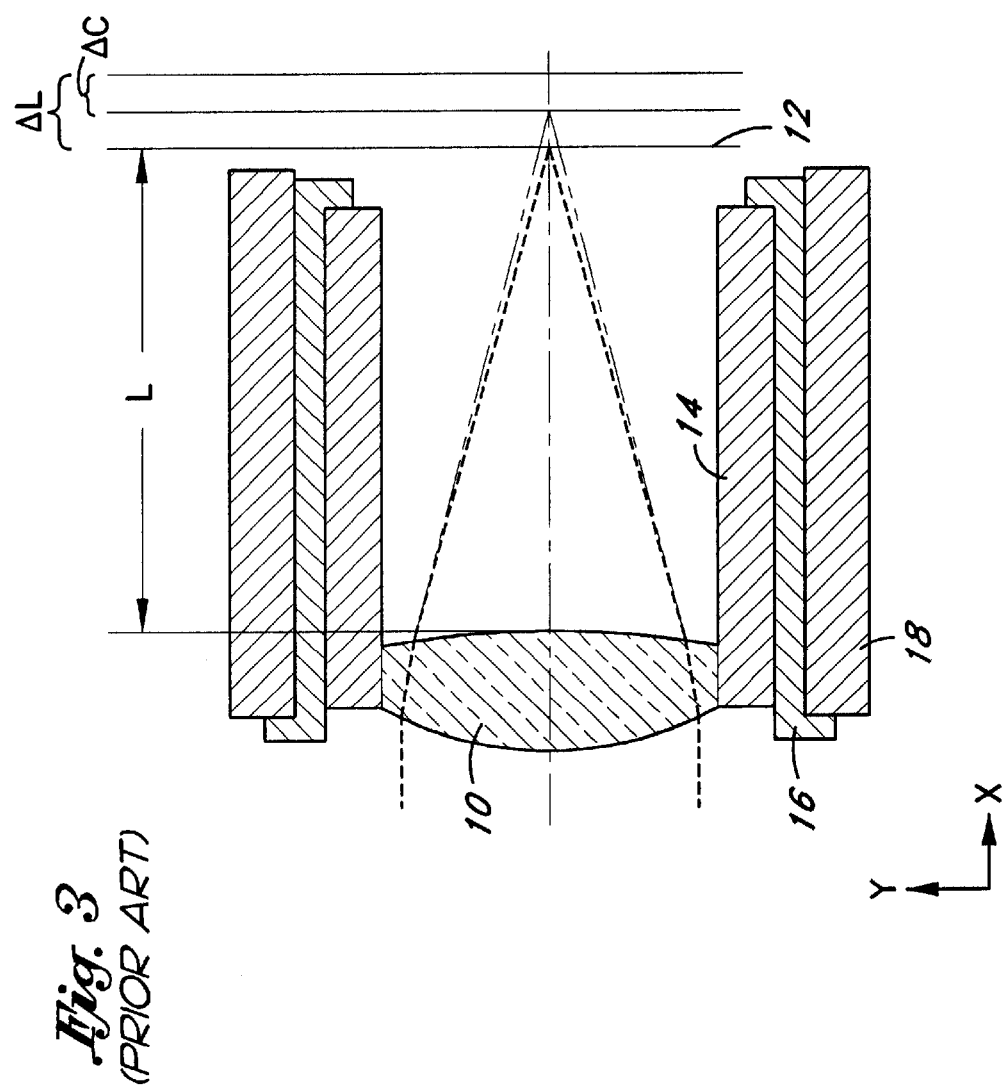
FIG. 3 illustrates another form of the prior art athermalized plastic lens element apparatus.

In the following description, for purposes of explanation, numerous details are set forth in order to provide a thorough understanding of the present invention. However, it will be apparent to one skilled in the art that these specific details are not required in order to practice the present invention. The athermalizing apparatuses of the present invention apply to all types of lenses (e.g., plastic, glass, etc.). However, since thermal image defects are more severe in plastic lenses, the description will focus on plastic lenses.

FIG. 4 illustrates a first athermalizing apparatus of the present invention. Referring to FIG. 4, the passive athermalizing apparatus 100 includes a plastic lens element 120 having an optical axis 110 with an effective focal length ("EFL") of L to an image plane 130. The lens element 120 is supported by a cone-shaped inner cylinder 122 having an inner surface 132 and an outer surface 134 that is sloped with respect to the optical axis 110. Moreover, the inner cylinder is made from a very high expansive material (e.g., acrylic). The inner cylinder 122 is surrounded by an outer cylinder 126 which is made from a very low expansive material (e.g., Invar, aluminum, etc.) and is rigidly fixed in space. Between the inner and outer cylinders 122 and 126 are a plurality of ribs $124_1$–$124_N$ (where N is a positive whole number) which are made from a very high expansive material. The apparatus 100 will be described with respect to one rib, although the description will apply to each rib. The rib 124 is bonded into the internal diameter (e.g., inner surface) 136 of the outer cylinder 126. The rib 124 has a sloped surface that is substantially complementary and bears against the outer surface 134 of the inner cylinder 122. In the preferred embodiment, three ribs are used.

In one embodiment, the rib 124 is made from Acrylonitrile-Butadiene Styrene ("ABS") to provide a high coefficient of thermal expansion ("CTE") and also to provide "slip" against the outer surface 134 of the inner cylinder 122. Typically, the inner cylinder 122 and the rib 124 are made from material which slip against each other such as, but not limited or restricted to, plastic on plastic, plastic on metal, etc. The sloped (or ramped) outer surface 134 of the inner cylinder 122 forms a ramp angle, α, with respect to the optical axis 110. One or more springs 128 hold the inner cylinder 122 in contact with the rib 124 to provide a restoring force.

As the temperature increases, the outer cylinder 126 essentially does not expand. Moreover, since the outer cylinder 126 does not expand, the outer surface of the rib 124 also does not expand radially outward. On the other hand, the inner surface of the rib 124 expands radially inward against the outer surface 134 of the inner cylinder 122. At the same time, the inner cylinder 122 radially expands outward against the rib 124. At the ramp interface between the rib 124 and the inner cylinder 122, the inner cylinder 122 (and the lens element 120 mounted to the inner cylinder) will "slip" and generally move in the –X direction away from the image plane 130. Since the image distance becomes longer as the temperature increases, the athermalizing apparatus compensates for the thermal focal shift.

The ramp angle α translates a small radially inward movement by the plurality of ribs $124_1$–$124_N$ (and the small radially outward movement by the inner cylinder 122) into a large axial displacement. The axial displacement is a function of the cotangent of the ramp angle (COT(α)). For example, for a ramp angle of 12.5 degrees, the ratio of axial to radial displacement is COT(12.5) or 4.51. For a ramp angle of 45 degrees, there is a one to one relationship between the axial and radial displacement since the COT (45) is 1 and, therefore, the ramp angle should be less than 45 degrees. On the other hand, if the ramp angle is too small, the horizontal component of the coefficient of friction may prevent the inner cylinder 122 from "slipping". In the preferred embodiment, the ramp angle is between 10 to 15 degrees, although other ramp angle values may be used depending on the amount of compensation needed, the material of the cylinders, and the like, for a particular design. The geometry of the cone-shaped inner cylinder 122 effectively works as a "lever arm" to increase the effect of axial thermal expansion in a very compact geometry. In an alternative embodiment, the outer cylinder is coupled to a second lens element (not shown). In this alternative embodiment, the athermalizing apparatus 100 is used to adjust an airspace between the lens element 120 and the second lens element to potentially provide greater thermal compensation.

The following is an example that illustrates one advantage of the present invention. For this example, the singlet plastic acrylic lens element 10 of FIG. 1 is used which has a f/2.0 relative aperture and a 25.4 mm focal length. Each rib 124 (three ribs are used in this example) is made from ABS having a CTE of 865E-7/1° C. The inner cylinder 122 is made from acrylic and has a CTE of 830E-7/1° C. At +20 C., the radius of the inner cylinder 122 is d/2 or 12.7 mm, the thickness (t) of each rib 124 is 6.25 mm, and the ramp angle α is 12.5 degrees. As the temperature is increased from +20° C. to +30° C., the image plane distance from the rear vertex increases by ΔL or +0.071 mm. The outer surfaces of each rib 124 does not expand because the surrounding Invar outer cylinder 126 does not expand. The inner surface of each rib expands radially inward toward the inner cylinder 122 by 0.0054 mm. At the same time, the outer surface 134 of the inner cylinder 122 expands radially outward by 0.0105 mm. The total radial expansion is therefore 0.0159 mm. The outer surface 134 of the inner cylinder 122 must slip inside the three ribs until the radial expansion is accommodated. The axial displacement of the inner cylinder 122 to achieve this accommodation is (0.0159)×(COT (12.5)), or 0.0717 mm. The axial displacement exactly compensates for the 0.0710 mm thermal focal shift of the lens. It is to be appreciated that this example is merely an illustration and not intended as a limitation of the present invention.

The materials and geometry selection of the athermalizing apparatus 100 controls the amount of axial displacement. This allows the athermalizing apparatus 100 to compensate for a wide range of lenses (with different thermal focal shifts). The ability to "fine tune" an athermalization apparatus is typically not available with prior art arrangements.

FIG. 5 illustrates a second athermalizing apparatus 200 of the present invention. In this embodiment, the athermalizing apparatus 200 includes a lens element 220 having an optical axis 210. The lens element 220 is supported by a support member ("support cell") 222 which is made from a high-expansive material. The support cell 222 includes a first set of fingers 224 (e.g., three) radially protruding outward from the top of the support cell 222 and a second set of fingers 226 radially protruding outward from the bottom of the support cell 222. The first and second sets of support fingers 224 and 226 ride on a cone surface 230 on the inside of a cylindrical member 228 which is made from a low-expansive material. The cone surface 230 makes a cone angle a with respect to the optical axis 210. In another embodiment, the cylindrical member 228 is made from a high-expansive material and the support cell 222 is made from a low-expansive material.

As temperature increases, the cone surface 230 essentially does not expand whereas the first and second sets of fingers 224 and 226 expand radially outward. As the first and second sets of fingers 224 and 226 increase in diameter, the support cell 222 moves axially to accommodate for the increase in diameter of the fingers 224 and 226 which causes the fingers to rest at a higher section of the cone surface 230. Similarly, as the temperature decreases, the fingers 224 and 226 expand radially inward. This causes the fingers to rest at a lower section on the cone surface 230. Once again, the ratio of axial displacement to radial expansion is a function of the cotangent of the cone angle α. Accordingly, a small change in temperature induces a large axial displacement.

FIG. 6 illustrates a third athermalizing apparatus 300 of the present invention. The third athermalizing apparatus 300 is similar to the first and second athermalizing apparatuses 100 and 200 in that they all translate radial expansion into axial displacement (i.e., they all provide a mechanical leverage). However, the third athermalizing apparatus 300 is different in that it does not have any moving parts.

More specifically, the third athermalizing apparatus 300 includes a lens element 310 having an optical axis 305 that is supported by a plurality of support members $320_1$–$320_N$ at a first end 322. In one embodiment, three support members are used to support the lens element 310, although a different number may be used in lieu thereof. For sake of clarity, the present invention will be described with respect to one support member. However, the description equally applies to the other support members. The support member 320 is made from a high-expansive material. A second end 324 of the support member 320 is coupled to an outer circular ring 330 which is made from a low-expansive material (e.g., Invar). With respect to the optical axis 305, the support member 320 makes an angle θ (the larger the angle θ, the better the mechanical leverage of the apparatus).

As the temperature increases, the first end 322 of the support member 320 generally expands in a radial direction outward while the length of the support member 320 increases. The first end 322 does not move out because the second end 324 is fixed to the circular ring 330. The circular ring 330 does not expand and prevents an outer surface 326 of the support member 320 at its second end 324 from radially expanding outward. On the other hand, the inner surface 328 of the support member 320 radially expands inward. The combination of the radial expansion of the first end 322 of the support member 320, the inward radial expansion of the inner surface 328, and the increase in the length of the support member 320 causes the first end 322 to rotate outward in a small arc to provide a controlled axial displacement. This embodiment relies on large angle θ to achieve a large axial displacement and is therefore more useful for compact lens systems with large mounting diameters.

An example is provided for illustration purposes only. Lens element 310 is the plastic singlet lens element 10 of FIG. 1. The support member 320 is made from ABS, is 20.000 mm long, and makes a 30 degree angle with respect to the optical axis 305. The first end 322 of the support member 320 that captures the lens element 310 has a semi-diameter of d1 or 6.25 mm. The semi-diameter from the optical axis 305 to the bottom surface 328 of the support member 320 at the second end 324 is d2 or 16.250 mm. As the temperature increases from +20° C. to +30° C., the angle θ decreases to 29.940 degrees, the length of the support member increases to 20.0166 mm, the semi-diameter d1 increases to 6.256 mm, and the semi-diameter d2 decreases to 16.246 mm. The new geometry at the elevated temperature requires that the axial displacement of the lens element 310 to increase from 17.320 mm to 17.346 mm, which is an axial displacement of 0.026 mm. When the angle θ is reduced to zero, the case reverts to the standard plastic cylindrical mount in FIG. 2 where the axial displacement was 0.019 mm. Making the athermalizing apparatus in the form of a cone (rather than a right circular cylinder) moderately increases the thermal compensation and (by angle selection) permits "fine tuning" of the compensation.

FIG. 7 illustrates a fourth athermalizing apparatus 400 of the present invention. In this embodiment, the athermalizing apparatus 400 is used to adjust an airspace (or distance) between lens elements in a lens assembly instead of adjusting an axial displacement of an entire lens assembly. Often it is possible to achieve greater thermal compensation (or control aberration balance) by adjusting an airspace.

Referring to FIG. 7, the athermalizing apparatus 400 includes a first lens element 410 having an optical axis 405. The first lens element 410 is supported and fixed in space by a support 420 which is made from a low-expansive material. The support 420 is also coupled to a second lens element 412 by way of a plurality of support members $430_1$–$430_N$ (where N is a positive whole number) which are made from high-expansive material. With respect to the optical axis 405, each support member $430_1$–$430_N$ makes an angle θ. As temperature increases, the length of each support member $430_1$–$430_N$ increases and its first end 432 radially expands outward to cause the first end 432 to rotate outward in a small arc and provide a controlled axial displacement of the apparatus similar to the apparatus in FIG. 6. This increases the airspace between the first and second lens elements which causes a large shift in focal length and provides greater thermal compensation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus having a lens element, the apparatus comprising:
   a support member to support the lens element, the support member including a sloped outer surface; and
   a first rib member having a sloped surface substantially complementary and adjacent to the sloped outer surface of the support member to allow for the first rib member to
   (i) expand and slip against the sloped outer surface of the support member in response to a change in temperature, and
   (ii) cause an axial displacement of the support member.

2. The apparatus of claim 1 further comprising an outer member coupled to the first rib member.

3. The apparatus of claim 2 wherein the support member is made of a material having a higher coefficient of thermal expansion than the outer member.

4. The apparatus of claim 2 further comprising a second lens element coupled to the outer member.

5. The apparatus of claim 4 wherein the change in temperature causes the support member to slip against the rib member and move axially, causing a distance between the lens element and the second lens element to be modified.

6. The apparatus of claim 1 wherein the support member radially expands and slips against the sloped surface of the first rib member, causing the axial displacement of the support member, in response to the change in temperature.

7. The apparatus of claim 1 wherein the sloped outer surface of the support member forms a ramp angle with respect to an optical axis of the lens element.

8. The apparatus of claim 7 wherein the change in temperature causes an axial displacement of the support member as a function of the cotangent of the ramp angle.

9. The apparatus of claim 1 further comprising second and third rib members each having a sloped surface that is substantially complementary and adjacent to the sloped outer surface of the support member.

10. The apparatus of claim 1, wherein axial displacement of the support member is selected to compensate for a focal shift of the lens element due to the change in temperature.

11. A method comprising:
    providing an athermalizing apparatus including a lens element, a first member to support the lens element and having a sloped outer surface, and at least one rib member each having a sloped surface that is substantially complementary and adjacent to the sloped outer surface of the first member; and
    introducing an axial displacement of the first member in response to a change in temperature by the at least one rib member expanding and slipping against the sloped outer surface of the first member.

12. The method of claim 11 wherein the introducing of the axial displacement is in response to an increase in the temperature.

13. The method of claim 11 wherein the introducing of the axial displacement of the first member is further by radially expanding and slipping of the sloped outer surface of the first member against the sloped surface of the at least one rib member.

14. The method of claim 11 wherein the introducing of the axial displacement compensates for a focal shift in the lens element.

15. A method comprising:
    providing an athermalizing apparatus including a lens element, a first member to support the lens element and having a sloped outer surface, and at least one rib member each having a sloped surface that is substantially complementary and adjacent to the sloped outer surface of the first member; and
    introducing an axial displacement of the first member in response to a change in temperature by the first member expanding and slipping against the sloped surface of the rib member.

16. The method of claim 15 wherein the introducing of the axial displacement is in response to an increase in the temperature.

17. The method of claim 15 wherein the introducing of the axial displacement compensates for a focal shift in the lens element.

18. A method comprising:
    providing an athermalizing apparatus including
    (i) a lens element,
    (ii) a support member coupled to the lens element and having one or more fingers, and
    (iii) an outer member that has a sloped inner surface that bears against the one or more fingers of the support member; and
    introducing an axial displacement of the support member in response to a temperature change by the one or more fingers of the support member to slip against the inner surface of the outer member.

19. The method of claim 18 wherein the introducing of the axial displacement is in response to an increase in the temperature.

20. The method of claim 18 wherein the introducing of the axial displacement of the support member, which is made of a material having a high coefficient of thermal expansion, is caused by the one or more fingers of the support member radially expanding and slipping against the inner surface of the outer member in response to the changing of the temperature.

21. A lens support apparatus comprising:
    a lens support means for supporting a lens element, the lens support means including a sloped outer surface; and
    a thermal compensation means for axially displacing the lens element by expanding and slipping against the sloped outer surface of the lens support means and axially displacing the lens support means responsive to a change in temperature, the thermal compensation means having a sloped surface substantially complementary and adjacent to the sloped outer surface of the lens support means.

22. The apparatus of claim 21 further comprising an outer support means for supporting the thermal compensation means.

23. The apparatus of claim 22 wherein the lens support means is made of a material having a higher coefficient of thermal expansion than the outer support means.

24. The apparatus of claim 22 further comprising a second lens element coupled to the outer support means.

25. The apparatus of claim 24 wherein the lens support means is for modifying a distance between the lens element and the second lens element by slipping against the thermal compensation means and moving the lens support means and the lens element axially relative to the outer support means and the second lens element, responsive to the change in temperature.

26. The apparatus of claim 21 wherein the lens support means is for axially displacing the lens element by radially expanding and slipping against the sloped surface of the thermal compensation means, and axially displacing the lens support means responsive to the change in temperature.

27. The apparatus of claim 21 wherein the sloped outer surface of the lens support means forms a ramp angle with respect to an optical axis of the lens element.

28. The apparatus of claim 27 wherein the change in temperature causes an axial displacement of the lens support means as a function of the cotangent of the ramp angle.

29. The apparatus of claim 21 further comprising second and third thermal compensation means each having a sloped surface that is substantially complementary and adjacent to the sloped outer surface of the lens support means.

30. The apparatus of claim 21, wherein axial displacement of the lens support means is selected to compensate for a focal shift of the lens element due to the change in temperature.

* * * * *